Oct. 26, 1926.

J. M. STRATTON

PUMP

Filed Feb. 1, 1922

1,604,793

2 Sheets-Sheet 1

INVENTOR
James M. Stratton,
By Baker & Macklin,
ATTORNEYS

Oct. 26, 1926.  
J. M. STRATTON  
PUMP  
Filed Feb. 1, 1922  
1,604,793  
2 Sheets-Sheet 2
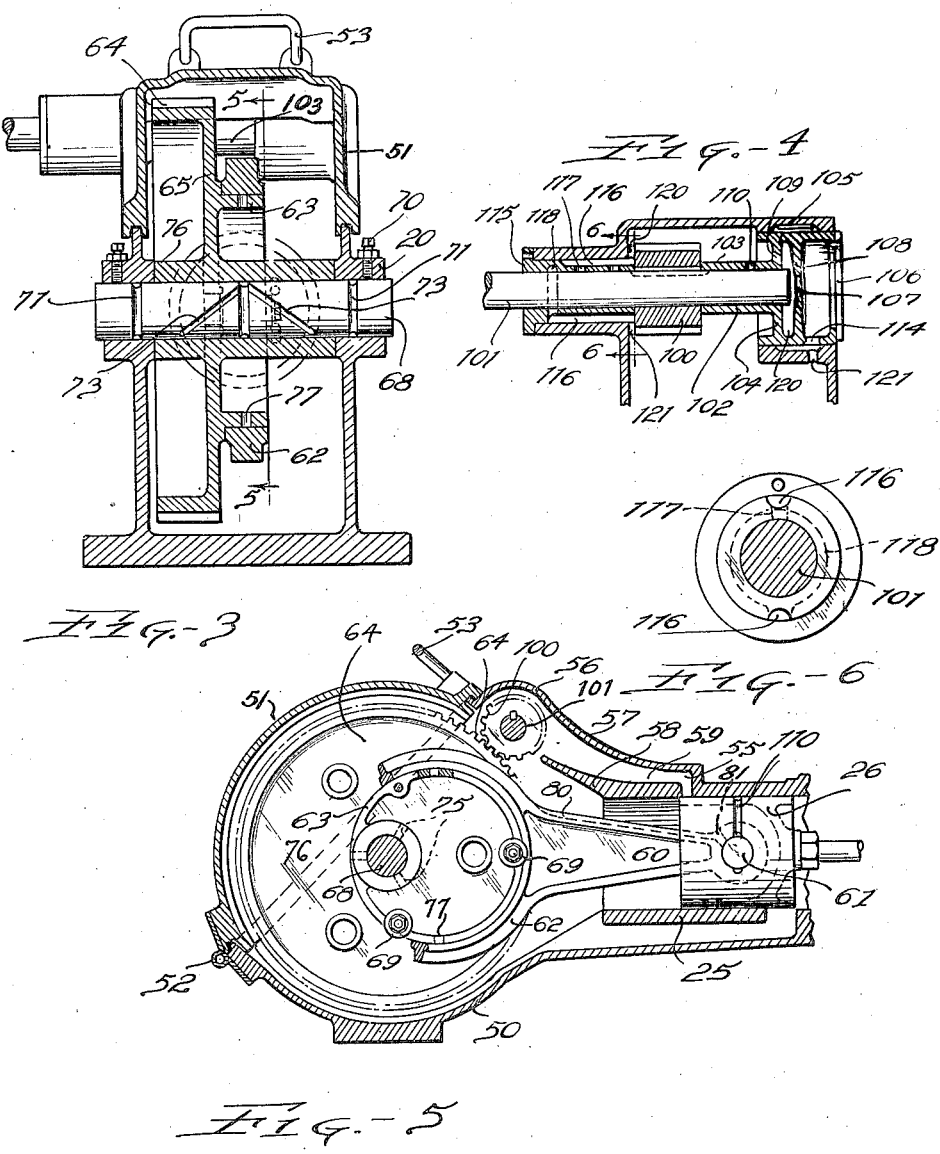
INVENTOR  
James M. Stratton,  
BY Bates & Macklin,  
ATTORNEYS Patented Oct. 26, 1926.

1,604,793

UNITED STATES PATENT OFFICE.

JAMES M. STRATTON, OF SALEM, OHIO, ASSIGNOR TO THE DEMING COMPANY, OF SALEM, OHIO, A CORPORATION OF OHIO.

PUMP.

Application filed February 1, 1922. Serial No. 533,359.

This invention relates to pumps and has particular reference to a pump of the enclosed drive type. The general object of the invention is to provide a pump of the type described with a lubricating system which is positive in its action and yet is quite simple and does not require the attention of an operator.

A specific object of the invention is to provide an improved means for lubricating the bearings of the wrist pin of a pump, both at its connection with the cross head and at its connection with the connecting rod.

An additional object of the invention is to provide an improved bearing for the drive member of an enclosed pump so that positive lubrication of the drive member may be effected.

A further object of the invention is to provide a unitary driven member and eccentric constructed so that it can be easily made and assembled.

Figure 1:
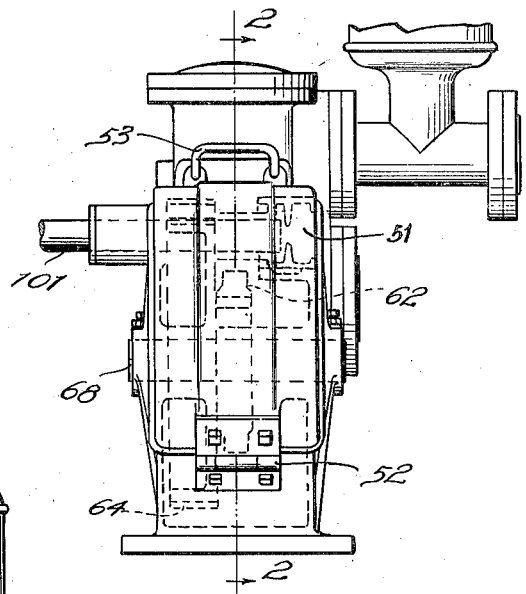
Figure 2:
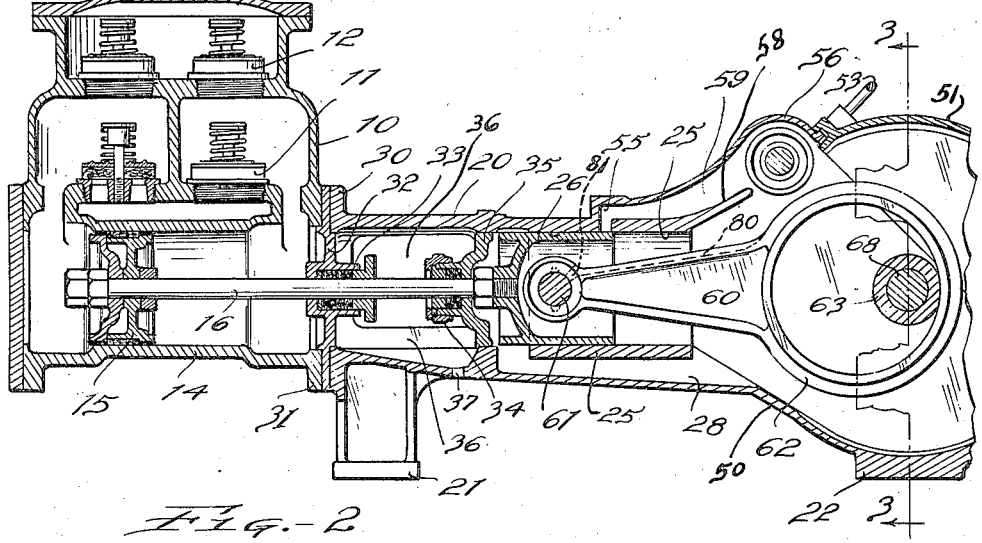

Further and additional objects will be apparent from the following description taken in connection with the accompanying drawings wherein Fig. 1 is an end veiw of the pump showing my invention; Fig. 2 is a section on the line 2—2, Fig. 1; Fig. 3, is a section on the line 3—3, Fig. 2; Fig. 4 is a sectional detail showing the bearings for the pinion shaft and related parts; Fig. 5 is a fragmentary central sectional view of the power casing showing an eccentric in one position, and Fig. 6 is an enlarged section on the line 6—6, Fig. 4 with the casing removed showing the bearing in elevation.

Referring to the drawings, by reference characters, I have shown a casing for an enclosed pump at 10. This casing is indicated as provided with the usual suction and discharge valves 11 and 12 and with a cylinder 14 in which a piston 15 is reciprocated by means of a piston rod 16. Water heads of the type described are old and well-known and form no part of the present invention. Furthermore, I wish it to be understood that the invention to be hereinafter described may be used in connection with any type of pump or water head desired without departing from the scope of my invention.

Referring again to the drawings, I have shown a second casing at 20 provided with supports or standards 21 and 22 shown as cast integrally therewith. The casing 20 is interiorly bored as at 25 to provide a cylinder to receive a piston 26 which is indicated as connected to the piston rod 16. It will be noted that the cylinder 25 is spaced from the casing 20 to form a channel 28 which slopes toward the larger end of the casing. The casing 20 is provided with a flange 30 which is indicated as abutting a flange 31 on the water head 16. A baffle member 32 is disposed between the abutting flanges and this baffle is provided with a packing gland 33. A second packing 34 is arranged on a baffle 35 located near the end of the cylinder 25.

The construction described provides a chamber 36 between the two baffles. The bottom wall of this chamber is provided with an aperture 37 so that any water from the pump or elsewhere which collects on the rod 16 will be wiped off by the packing gland and will drop into the chamber 36, whence it may be drained away and will not enter the power casing proper.

The portion of the drive casing in advance of the cylinder 25 comprises a curved portion 50 which includes a movable top portion 51 shown as hinged to the casing. The handle 53 serves to operate the closure 51. The top portion of the casing is rounded out as at 56 to provide a portion to house a drive pinion presently to be described.

A wall 57 of the protuberance 56 in conjunction with the wall 58 which springs from the cylinder 25 forms a channel 59 which communicates by means of a passage 55 with the interior of the cylinder 25. The cross-head 26 in the form of a piston is arranged to reciprocate in the bore 25. This cross-head is connected with the rod 16 and is provided with a wrist pin 61 to which one end of a pitman 60 is connected. The other end 62 of the pitman is shown as fitted over an eccentric member 63. This eccentric member 63 is shown as integrally cast on the face 65 of a gear 64. The pitman may be held on the eccentric by suitable fastening members 69.

It will be noted that the gear 64 and eccentric 63 have a hub 76 which is integral therewith and which extends entirely across the casing 50. To afford a support for this hub a suitable shaft 68 is provided; this shaft has a driving fit in apertures in the casing and is held in place by set screws 70. Packing grooves 71 in the axle serve to prevent leakage of oil from the casing.

The shaft 68 is provided with grooves 73 so that oil may be conducted through apertures 75 in the hub 76 of the gear wheel for lubricating the axle. Apertures 77 through the eccentric ring serve to conduct oil to the eccentric strap.

The upper face of the pitman 60 is recessed as shown at 80. This recess leads to an aperture 81 in the collar on the end of the pitman whereby lubricant which falls upon the top of the pitman will run down the pitman and through the aperture 81 and thus lubricate the connection between the pitman rod and the cross head.

The pitman may be driven by means of a pinion 100 which is indicated as meshing with the gear 64. This pinion may be keyed to a suitable shaft 101 which may be driven by an electric motor or other suitable means. In order to furnish a bearing for this shaft, I provide, as shown in Fig. 4, a bearing member 102 which comprises a tubular portion 103 which has a flange 104 thereon. A collar 105 which may be closed at its outer end by the face plate 106 has an inwardly extending flange 108 intermediate its ends. This flange is apertured at its center 107. The flange 104 is apertured at 109 and the tubular portion 103 is apertured at 110, while the collar 105 is apertured at 114.

The opposite bearing for the shaft 101 is provided with a bearing 115 which is provided with longitudinal oil grooves 116. These grooves are located on opposite sides of the bearing and one groove communicates through openings 117 with the shaft, while the other groove communicates with the peripheral groove 118. The oil which enters the aperture 116 through the opening 120, flows through the openings 117; that part of it which moves toward the groove 118 enters this groove whence it is conducted to the groove 116 and back to the oil reservoir through opening 121.

The operation of my device is as follows:—The casing 20 being partially filled with oil, when the pinion 100 drives the gear 64, a quantity of this oil is carried on the teeth circumferentially, until it strikes the pinion, after which, part of the oil drops or splashes from the pinion onto the pitman and is conducted through the channel 80 and aperture 81 to the cross head. Some of the oil leaves the pinion and enters the channel 80 whence it passes through the aperture 81 and serves to lubricate the outer surface of the cross head or piston 26.

The piston 26 is provided with circumferential surface grooves 110 so that when these grooves align with the opening 61, oil may enter these grooves and flow down to lubricate the cross head pin where it bears against the piston.

The rotation of the pinion causes some oil to be thrown off laterally from the pinion and this oil passes through the apertures 109, and 110. That which passes through the aperture 110 serves to at once lubricate the shaft, while that which passes through the aperture 109 passes thence into a cavity 120 between the collar 104 and the flange 108. The aperture 107 is of a diameter such that its boundary wall is higher than the periphery of the shaft, thus causing the top of the column of oil in the cavity to be above the lower surface of the shaft to lubricate the same. The excess oil flows out the aperture 107 then through the aperture 114, through the aperture 121 in the casing and back to the oil supply. Some oil also passes through the aperture 120 to lubricate the bearing 115.

From the foregoing description it will be apparent that I have described a pump which is extremely simple in operation and which can be economically manufactured.

Having thus described my invention, I claim:

1. In a pump, driving means, a crosshead guide, a crosshead, a pitman connecting the driving means and crosshead by means of a wrist pin freely journalled in both the pitman and crosshead, an oilway on the pitman leading to the pitman wrist pin bearing, and oilways on the outside of the crosshead leading to the ends of the crosshead wrist pin bearings.

2. In a pump, driving means, the combination of a casing comprising a crosshead guide, said guide having an aperture in the upper portion thereof adapted to permit the passage of oil therethrough, a crosshead in the form of a piston having a wrist pin journalled therein and grooves cut on the exterior of said piston affording communication to the ends of said wrist pin bearings.

3. In combination, with a pump casing, a drive shaft, a bearing for the drive shaft, said bearing comprising a collar in which the shaft is journalled, a collar of larger diameter mounted in the pump casing and a member connecting the collars, there being a peripheral inwardly extending flange in the collar of larger diameter, forming with said member an oil reservoir, there being an aperture leading to said reservoir.

4. In a pump, a shaft, a casing, a bearing in the casing for the shaft comprising a collar in which the shaft is journalled, a collar of larger diameter mounted in the pump casing, and an annular member connecting the collars, a peripheral inwardly extending flange connected to the collar of larger diameter to form with the annular member an oil reservoir, the brim of the reservoir being above the lowest portion of the shaft so that the latter will always be in contact with the oil, there being an aperture leading to said reservoir and an aperture without said reservoir, both apertures communicating with the casing and providing circulation of oil through said reservoir.

5. In a pump, an enclosed casing including a slideway, said casing having an oil chamber, a driving member mounted in said casing and adapted to elevate oil from the chamber, a passageway leading from a point adjacent the top of the casing and communicating with the slideway, a crosshead in the slideway, a wrist pin journalled therein, a pitman connecting the driving member and said wrist pin, a groove in the crosshead leading to the ends of the crosshead pin, said groove being adapted to communicate with said passageway in one position of the crosshead so that oil carried by the driving member into said passageway lubricates the ends of the crosshead pin.

6. In a pump, the combination of a casing, adapted to contain a supply of oil, a stationary shaft extending across the casing, means for securing said shaft tightly in the side walls of the casing, packing about the shaft preventing leakage of oil, a gear within the casing loose on the shaft and adapted to extend into the oil of the oil supply, a driving pinion meshing with such gear, and pump piston and a driving connection between it and the gear.

In testimony whereof, I hereunto affix my signature.

JAMES M. STRATTON.